United States Patent
Yoshida (10) Patent No.: US 9,376,560 B2
(45) Date of Patent: Jun. 28, 2016

(54) MATRIX MATERIAL

(71) Applicant: HONDA MOTOR CO., LTD., Tokyo (JP)

(72) Inventor: Shuichiro Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 14/306,814

(22) Filed: Jun. 17, 2014

(65) Prior Publication Data

US 2015/0005458 A1  Jan. 1, 2015

(30) Foreign Application Priority Data

Jun. 26, 2013  (JP) .................................. 2013-133555
May 27, 2014  (JP) .................................. 2014-109040

(51) Int. Cl.
*C08L 63/00* (2006.01)
*C08G 59/02* (2006.01)

(52) U.S. Cl.
CPC .................. *C08L 63/00* (2013.01); *C08G 59/02* (2013.01)

(58) Field of Classification Search
CPC ...................................................... C08L 63/00
USPC .......................................................... 525/526
See application file for complete search history.

(56) References Cited

U.S. PATENT DOCUMENTS

2003/0153650 A1*  8/2003  Tada .................... C08G 59/621
                                                               523/400
2009/0130379 A1*  5/2009  Kousaka et al. .............. 428/116

FOREIGN PATENT DOCUMENTS

| JP | 08-334455 | 12/1996 |
| JP | 08-334455 | 12/1997 |
| JP | 2006-249395 | 9/2006 |
| JP | 2011-214209 | 10/2011 |

* cited by examiner

*Primary Examiner* — David Karst
(74) *Attorney, Agent, or Firm* — Rankin, Hill & Clark LLP (57) ABSTRACT

The present invention relates to a matrix material for a carbon fiber-reinforced composite. The matrix material for the carbon fiber composite contains a matrix resin as a resin component. The matrix resin contains at least a first epoxy resin containing a polyfunctional glycidylamine-type epoxy resin having four epoxy groups in one molecule. The matrix resin may further contain at least one of a p-aminophenol-type epoxy resin having three epoxy groups in one molecule, and a tetramethylbiphenol-type solid epoxy resin having two epoxy groups in one molecule. The matrix resin has an average epoxy equivalency of 99 to 163.

8 Claims, 3 Drawing Sheets

|  | FIRST EPOXY RESIN | | SECOND EPOXY RESIN | | | HARDENER (PARTS BY WEIGHT) | AVERAGE EPOXY EQUIVALENCY OF MATRIX RESIN | SHEAR STRENGTH τ (MPa) |
|---|---|---|---|---|---|---|---|---|
|  | MY721 (phr) | EPOXY EQUIVALENCY | jER630 (phr) | YX4000 (phr) | AVERAGE EPOXY EQUIVALENCY |  |  |  |
| EXAMPLE 1 | 50 | 53 | 50 | 0 | 46 | 64 | 99 | 110 |
| EXAMPLE 2 | 50 | 53 | 40 | 10 | 55 | 61 | 108 | 104 |
| EXAMPLE 3 | 50 | 53 | 30 | 20 | 63 | 57 | 116 | 100 |
| EXAMPLE 4 | 100 | 106 | 0 | 0 | 0 | 59 | 106 | 100 |
| EXAMPLE 5 | 40 | 42 | 30 | 30 | 81 | 55 | 123 | 92 |
| EXAMPLE 6 | 40 | 42 | 10 | 50 | 98 | 48 | 140 | 87 |
| EXAMPLE 7 | 30 | 32 | 20 | 50 | 107 | 49 | 139 | 85 |
| EXAMPLE 8 | 70 | 74 | 10 | 20 | 45 | 56 | 119 | 77 |
| EXAMPLE 9 | 20 | 21 | 0 | 80 | 142 | 40 | 163 | 66 |

FIG. 1

| | FIRST EPOXY RESIN | | SECOND EPOXY RESIN | | | HARDENER (PARTS BY WEIGHT) | AVERAGE EPOXY EQUIVALENCY OF MATRIX RESIN | SHEAR STRENGTH τ (MPa) |
|---|---|---|---|---|---|---|---|---|
| | MY721 (phr) | EPOXY EQUIVALENCY | jER630 (phr) | YX4000 (phr) | AVERAGE EPOXY EQUIVALENCY | | | |
| EXAMPLE 1 | 50 | 53 | 50 | 0 | 46 | 64 | 99 | 110 |
| EXAMPLE 2 | 50 | 53 | 40 | 10 | 55 | 61 | 108 | 104 |
| EXAMPLE 3 | 50 | 53 | 30 | 20 | 63 | 57 | 116 | 100 |
| EXAMPLE 4 | 100 | 106 | 0 | 0 | 0 | 59 | 106 | 100 |
| EXAMPLE 5 | 40 | 42 | 30 | 30 | 81 | 55 | 123 | 92 |
| EXAMPLE 6 | 40 | 42 | 10 | 50 | 98 | 48 | 140 | 87 |
| EXAMPLE 7 | 30 | 32 | 20 | 50 | 107 | 49 | 139 | 85 |
| EXAMPLE 8 | 70 | 74 | 10 | 20 | 45 | 56 | 119 | 77 |
| EXAMPLE 9 | 20 | 21 | 0 | 80 | 142 | 40 | 163 | 66 |

FIG. 2

| | FIRST EPOXY RESIN | | SECOND EPOXY RESIN | | | | HARDENER (PARTS BY WEIGHT) | AVERAGE EPOXY EQUIVALENCY OF MATRIX RESIN | SHEAR STRENGTH τ (MPa) |
|---|---|---|---|---|---|---|---|---|---|
| | MY721 (phr) | EPOXY EQUIVALENCY | jER630 (phr) | YX4000 (phr) | | AVERAGE EPOXY EQUIVALENCY | | | |
| EXAMPLE 10 | 70 | 74 | 25 | 5 | | 32 | 61 | 106 | 121 |
| EXAMPLE 11 | 70 | 74 | 20 | 10 | | 36 | 59 | 110 | 120 |
| EXAMPLE 12 | 70 | 74 | 15 | 15 | | 40 | 57 | 115 | 113 |
| EXAMPLE 13 | 100 | 106 | 0 | 0 | | 0 | 59 | 106 | 108 |
| EXAMPLE 14 | 30 | 32 | 40 | 30 | | 90 | 56 | 122 | 107 |
| EXAMPLE 15 | 30 | 32 | 50 | 20 | | 81 | 59 | 113 | 100 |
| EXAMPLE 16 | 30 | 32 | 40 | 30 | | 90 | 56 | 122 | 92 |
| EXAMPLE 17 | 30 | 32 | 20 | 50 | | 107 | 49 | 139 | 87 |
| EXAMPLE 18 | 30 | 32 | 10 | 60 | | 115 | 46 | 147 | 76 |
| EXAMPLE 19 | 25 | 27 | 0 | 75 | | 133 | 42 | 159 | 70 |

FIG. 3

| COMPARATIVE EXAMPLE | jER828 (phr) | HARDENER (PARTS BY WEIGHT) | EPOXY EQUIVALENCY | SHEAR STRENGTH $\tau$ (MPa) |
|---|---|---|---|---|
| CARBON FIBER A | 100 | 33 | 190 | 55 |
| CARBON FIBER B | 100 | 33 | 190 | 49 |

MATRIX MATERIAL

CROSS-REFERENCE TO RELATED APPLICATIONS

This application is based upon and claims the benefit of priority from Japanese Patent Applications No. 2013-133555 filed on Jun. 26, 2013 and No. 2014-109040 filed on May 27, 2014, the contents all of which are incorporated herein by reference.

BACKGROUND OF THE INVENTION

1. Field of the Invention

The present invention relates to a matrix material for a carbon fiber-reinforced composite.

2. Description of the Related Art

A structure made of a carbon fiber-reinforced composite (CFRP) is lightweight and has excellent mechanical strength, and thus has been widely used in various fields. In general, the structure is produced using a CFRP prepreg in the following manner. A bundle (UD material) containing a plurality of carbon fibers, which are arranged parallel to each other, or a cross material containing carbon fibers woven horizontally and vertically is impregnated with a matrix material in order to form a prepreg sheet. A plurality of such prepreg sheets are stacked and molded under heat and pressure, and then the matrix material is hardened in order to obtain the CFRP structure. Preferably, the matrix material contains an epoxy resin as a resin component (matrix resin) from the viewpoints of strength and heat resistance, etc.

The prepreg and the structure prepared using the UD material exhibit lower strength in a direction perpendicular to the fiber direction than in the fiber direction. Furthermore, in the case that a plurality of prepreg sheets, which are prepared using the UD material or the cross material, are stacked, the resultant structure exhibits lower strength between the sheets in the stacking direction than in the fiber direction. Thus, the CFRP structure exhibits relatively low strength in a particular direction, and has an anisotropic strength property. However, in the case of using the structure as a member of an aircraft or the like, the structure is required to be extremely excellent in terms of strength, etc. Therefore, it is necessary to enhance the strength of the structure sufficiently in the particular direction.

The strength property of the entire structure, including the strength in the particular direction, can be improved by increasing interfacial adhesion between the carbon fiber and the matrix material, so as to suppress a reduction in strength due to anisotropy. Japanese Laid-Open Patent Publication Nos. 2011-214209 and 2006-249395 propose methods of this type.

The technology of Japanese Laid-Open Patent Publication No. 2011-214209 involves subjecting a carbon fiber bundle to a surface treatment. In such a treatment, a sizing agent of a mixture containing a first compound and a second compound at a particular ratio is applied to the surface of the carbon fiber bundle. More specifically, in such a treatment, the first and second compounds are dissolved in an organic solvent or water in order to prepare a sizing agent solution, the carbon fiber bundle is immersed in the solution, and the organic solvent and the like are evaporated and removed. The first compound has a hydroxyl group and/or a carboxyl group with a primary amino group and/or a secondary amino group, and the second compound has an epoxy group.

In Japanese Laid-Open Patent Publication No. 2006-249395, carbon fiber is surface-treated with a sizing agent containing a vinyl ester resin or the like, and an unsaturated matrix resin and an epoxy resin are mixed in order to prepare a matrix material. In the surface treatment, the surface of the carbon fiber is subjected to oxidation and then is impregnated with the sizing agent using an immersion roller, etc. The unsaturated matrix resin may be a vinyl ester resin or the like, and the epoxy resin may be a bisphenol A-type epoxy resin or the like.

SUMMARY OF THE INVENTION

Commercially available carbon fibers have a surface coated with a sizing agent. In the case of applying another sizing agent to such a commercially available product, as described in Japanese Laid-Open Patent Publication Nos. 2011-214209 and 2006-249395, an additional surface treatment and a resin for the sizing agent are required. Therefore, a complicated process is required for producing the CFRP structure, which leads to an increase in production costs. Furthermore, in the case that the resin, which is used as the sizing agent, is mixed with the matrix material, for example, hardening of the matrix resin may be inhibited, such that the strength of the structure cannot be enhanced sufficiently.

In particular, in the surface treatment of Japanese Laid-Open Patent Publication No. 2011-214209, the sizing agent is dissolved in an organic solvent or the like, and then is applied to the carbon fiber. Thus, it is difficult to completely evaporate and remove the organic solvent from the sizing agent solution. Also, in the event that the organic solvent remains in the sizing agent solution, hardening of the matrix resin may be inhibited, such that the strength and heat resistance of the structure may become deteriorated.

In Japanese Laid-Open Patent Publication No. 2006-249395, as described above, the matrix material is a mixture of an epoxy resin and a different resin (such as a vinyl ester resin). In the case that different types of resins are mixed, for example, the resins may be poor in compatibility, and may disadvantageously exhibit different molding shrinkage ratios. Consequently, the resultant structure may become easily cracked, such that it is difficult for the strength thereof to be improved sufficiently.

A principal object of the present invention is to provide a matrix material, which is capable of easily and inexpensively increasing adhesion to a carbon fiber, and effectively improving the strength of a carbon fiber-reinforced composite structure.

According to an aspect of the present invention, there is provided a matrix material for a carbon fiber-reinforced composite comprising a matrix resin containing both a first epoxy resin and a second epoxy resin, or containing only the first epoxy resin. The first epoxy resin contains a polyfunctional glycidylamine-type epoxy resin having four epoxy groups in one molecule. The second epoxy resin contains at least one of a p-aminophenol-type epoxy resin having three epoxy groups in one molecule, and a tetramethylbiphenol-type solid epoxy resin having two epoxy groups in one molecule. The matrix resin has an average epoxy equivalency of 99 to 163, which is calculated using the following equation (A):

$$\text{average epoxy equivalency of matrix resin} = [\text{epoxy equivalency of first epoxy resin} \times (\text{weight percentage of first epoxy resin}/100)] + \text{average epoxy equivalency of second epoxy resin} \quad (A)$$

The average epoxy equivalency of the second epoxy resin is calculated using the following equation (B):

$$\text{average epoxy equivalency of second epoxy resin} = [\text{epoxy equivalency of p-aminophenol-type}$$

epoxy resin×(weight percentage of p-aminophe-
nol-type epoxy resin/100)]+[epoxy equivalency
of tetramethylbiphenol-type solid epoxy resin×
(weight percentage of tetramethylbiphenol-type
solid epoxy resin/100)]  (B)

In the matrix material of the present invention, the epoxy resin in the matrix resin has a main chain skeleton with a lower molecular weight between the epoxy groups, and a higher aromatic ring content than conventional epoxy resins such as bisphenol A-type epoxy resins.

Therefore, the matrix material contains a more rigid molecule than bisphenol A-type epoxy resins and the like, whereby the strength of the matrix material after hardening can be increased. Furthermore, the average epoxy equivalency of the matrix resin in the matrix material can effectively be reduced. Thus, the matrix material can have a large number of epoxy groups that form chemical bonds on a surface of a carbon fiber, thereby exhibiting an improved adhesive strength with respect to the carbon fiber.

In the present description, the term "epoxy equivalency" implies a value obtained by dividing the molecular weight of an epoxy resin by the epoxy group number of one molecule of the epoxy resin. Thus, when the epoxy resin has a lower epoxy equivalency (average epoxy equivalency), the epoxy resin has a larger number of epoxy groups per unit weight.

Furthermore, when the epoxy resin has a larger number of epoxy groups per unit weight, the epoxy resin tends to exhibit higher viscosity. Thus, when the epoxy resin has a lower epoxy equivalency, the epoxy resin exhibits lower wettability on the surface of the carbon fiber. Consequently, the contact area between the carbon fiber surface and the epoxy resin is reduced, so that it becomes difficult for the adhesive strength therebetween to be increased.

In the matrix material, the matrix resin has an average epoxy equivalency of 99 to 163, whereby the epoxy group number per unit weight can be well-balanced with the viscosity of the matrix material. Thus, the contact area between the carbon fiber surface and the matrix material can be increased, and chemical bonds can desirably be formed from the epoxy groups at the interface between the carbon fiber surface and the matrix material. Consequently, the adhesive strength between the carbon fiber and the matrix material can be further increased at the interface.

In addition, when the epoxy resin has a larger epoxy group number, although the hardening strength is increased, the epoxy resin exhibits a lower toughness. In the matrix material, since the average epoxy equivalency of the matrix resin is controlled within the above range, hardening strength and toughness (impact resistance) can also be well-balanced.

As a result, in a structure made up of the carbon fiber-reinforced composite (CFRP), which is prepared from the matrix material and the carbon fiber, a reduction in strength in a particular direction due to the anisotropic property thereof can be suppressed, and the strength of the entire structure can effectively be improved. In addition, the structure is excellent in terms of other properties such as heat resistance or impact resistance.

A structure having excellent properties as described above can be produced using the matrix material without applying any additional sizing agent to the carbon fiber surface. Therefore, a complicated process and increased costs are not required for production of the structure.

As described above, the matrix resin contains only epoxy resins and is free of other resins (different types of resins) apart from epoxy resins. Therefore, unlike a case in which a plurality of different resins are mixed, epoxy resins do not have the disadvantage of different molding shrinkage ratios, and the epoxy resins are compatible with each other. Consequently, inhibition of resin hardening and cracking of the structure can be prevented, and strength and heat resistance of the structure can advantageously be improved.

Accordingly, in the present invention, interfacial adhesion between the carbon fiber and the matrix material can be increased easily and inexpensively, and strength, heat resistance, impact resistance, and the like of the resultant CFRP structure can be improved adequately. Consequently, the resultant structure can suitably be used as a member or component of an aircraft. Thus, according to the present invention, a member for an aircraft can be provided with high reliability.

For example, in the matrix resin in the matrix material, preferably, the first epoxy resin has an epoxy equivalency of 21 to 106, and the second epoxy resin has an average epoxy equivalency of 0 to 142.

It is preferred that the polyfunctional glycidylamine-type epoxy resin is represented by the following structural formula (1), the p-aminophenol-type epoxy resin is represented by the following structural formula (2), and the tetramethylbiphenol-type solid epoxy resin is represented by the following structural formula (3).

(1)

(2)

(3)

By using the above-described epoxy resins, which have a main chain skeleton with a lower molecular weight between the epoxy groups and a higher aromatic ring content, the average epoxy equivalency of the matrix resin can effectively be reduced. Furthermore, the strength and the like of the structure, which is produced by hardening of the matrix material, can further be improved.

In view of improving the aforementioned properties, the matrix resin may contain 20 to 100 phr of the polyfunctional glycidylamine-type epoxy resin, and 80 to 0 phr of at least one of the p-aminophenol-type epoxy resin and the tetramethyl-biphenol-type solid epoxy resin. The term "phr (per hundred resin)" represents the weight ratio of each epoxy resin to the total 100 of the matrix resin (the epoxy resins).

The first epoxy resin includes four epoxy groups in one molecule. Therefore, the epoxy group number of the matrix resin can effectively be increased by increasing the ratio of the first epoxy resin in the matrix resin. Thus, the hardening strength of the matrix material can advantageously be increased by increasing the ratio of the first epoxy resin to 20 phr or more.

In this case, the matrix resin contains 0 to 80 phr of the second epoxy resin. The interface adhesive strength between the matrix material and the carbon fiber can desirably be increased by controlling the ratio of the second epoxy resin within this range, depending on the intended use of the structure, etc. Furthermore, another property such as the viscosity or toughness of the matrix material can be enhanced appropriately, while at the same time, the other property remains well-balanced with the hardening strength. Thus, the resultant structure can suitably be used as a member for an aircraft.

It is further preferred that the matrix resin contains 30 to 80 phr of the polyfunctional glycidylamine-type epoxy resin, and 70 to 20 phr of at least one of the p-aminophenol-type epoxy resin and the tetramethylbiphenol-type solid epoxy resin.

The matrix material preferably further contains 40 to 64 parts by weight of a hardener in addition to 100 parts by weight of the matrix resin. In this case, the matrix material can be hardened effectively, and the structure can be produced efficiently with a further improvement in strength.

The matrix material preferably has an adhesive strength of 66 to 121 MPa with respect to the carbon fiber, which is measured by a microdroplet method. In this case, the strength of the structure can be increased sufficiently, even in a particular direction in which the strength thereof often is lowered as a result of the anisotropic characteristic. Therefore, the structure can be used suitably as a member for an aircraft.

For example, a microdroplet method for measuring adhesive strength may be a composite interface property evaluation method, as described in Japanese Laid-Open Patent Publication No. 08-334455. Thus, after the matrix material has been attached to one carbon fiber and hardened, the adhesive strength can be calculated based on the shear force required for isolating the matrix material.

The strength of the structure in the particular direction, which often is lowered relatively due to the anisotropic characteristic, can be evaluated easily and efficiently using the microdroplet method. In general, in the case that the strength of the structure is evaluated directly in a particular direction (such as a direction perpendicular to the carbon fiber direction or the stacking direction), it is necessary for the structure to actually be produced. In contrast, in the case of using the microdroplet method, a measurement sample can be obtained merely by applying the matrix material to one carbon fiber and hardening the applied matrix material, as described above. Therefore, in the microdroplet method, it is not necessary for a prepreg or the structure to actually be produced, and the evaluation can be easily carried out in a short time.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of the matrix material of the present invention will be described in detail below with reference to the accompanying drawings.

A matrix material according to the present embodiment contains a matrix resin and a hardener added thereto, and the matrix material is used for a carbon fiber-reinforced composite (or a carbon fiber-reinforced plastic CFRP). Thus, a CFRP structure can be produced by the steps of impregnating a carbon fiber with the matrix material in order to prepare a prepreg, stacking a plurality of such prepregs, molding the stack under heat and pressure, and hardening the matrix material.

As described above, the matrix material contains the matrix resin as a resin component. In the present embodiment, the matrix resin contains only epoxy resins, and essentially contains a first epoxy resin. As will be described hereinafter, the matrix resin has an average epoxy equivalency of 99 to 163.

The first epoxy resin contains a polyfunctional glycidylamine-type epoxy resin having four epoxy groups in one molecule. Preferred examples of such polyfunctional glycidylamine-type epoxy resins include tetraglycidyldiaminodiphenylmethane, which is represented by the following structural formula (1). A commercially available product such as Araldite MY721 (trade name, available from Huntsman Advanced Materials) may be used as the resin.

(1)

The first epoxy resin has a main chain skeleton with a lower molecular weight between the epoxy groups, and has a higher aromatic ring content than conventional epoxy resins such as bisphenol A-type epoxy resins. Thus, the first epoxy resin contains a more rigid molecule, has a lower epoxy equivalency, and thereby exhibits excellent hardening strength.

The matrix resin may further contain a second epoxy resin, although the matrix resin may contain only the first epoxy resin. In the case that the matrix resin contains a second epoxy resin, the average epoxy equivalency of the matrix resin can easily and effectively be controlled within the above range.

The second epoxy resin has a molecular structure similar to that of the first epoxy resin, and exhibits excellent hardening strength.

The second epoxy resin contains at least one of a p-aminophenol-type epoxy resin having three epoxy groups in one molecule, and a tetramethylbiphenol-type solid epoxy resin having two epoxy groups in one molecule.

Preferred examples of such p-aminophenol-type epoxy resins include N,N-bis(oxiranylmethyl)-4-(oxiranylmethoxy)aniline, which is represented by the following structural formula (2). A commercially available product such as jER630 (trade name, available from Mitsubishi Chemical Corporation) may be used as the resin.

(2)

Preferred examples of such tetramethylbiphenol-type solid epoxy resins include 3,3',5,5'-tetramethyl-4,4-bis(glycidyloxy)-1,1'-biphenyl, which is represented by the following structural formula (3). A commercially available product such as YX4000 (trade name, available from Mitsubishi Chemical Corporation) may be used as the resin.

(3)

More specifically, the average epoxy equivalency of the matrix resin (the epoxy resins) can be calculated using the following equation (A):

average epoxy equivalency of matrix resin=[epoxy equivalency of first epoxy resin×(weight percentage of first epoxy resin/100)]+average epoxy equivalency of second epoxy resin  (A)

The average epoxy equivalency of the second epoxy resin can be calculated using the following equation (B):

average epoxy equivalency of second epoxy resin=
[epoxy equivalency of p-aminophenol-type epoxy resin×(weight percentage of p-aminophenol-type epoxy resin/100)]+[epoxy equivalency of tetramethylbiphenol-type solid epoxy resin×(weight percentage of tetramethylbiphenol-type solid epoxy resin/100)]  (B)

In the case that the matrix resin contains only the first epoxy resin, the weight percentages of the p-aminophenol-type epoxy resin and the methylbiphenol-type solid epoxy resin are 0, and thus the average epoxy equivalency of the second epoxy resin is 0. Therefore, in this case, the average epoxy equivalency of the matrix resin is equal to the epoxy equivalency of the first epoxy resin.

The epoxy equivalency of the first epoxy resin is a value obtained by dividing the molecular weight of the polyfunctional glycidylamine-type epoxy resin by 4. The weight percentage represents the weight ratio of the epoxy resin to the total 100% of the matrix resin, i.e. phr (per hundred resin). Thus, when the epoxy resin has a lower epoxy equivalency (average epoxy equivalency), the epoxy resin (in the matrix resin) has a larger number of epoxy groups per unit weight.

An example of an average epoxy equivalency calculation will be described below. For example, in the case that the matrix resin contains 50 phr of tetraglycidyldiaminodiphenylmethane having an epoxy equivalency of 106 (first epoxy resin), 40 phr of N,N-bis(oxiranylmethyl)-4-(oxiranylmethoxy)aniline having an epoxy equivalency of 92 (second epoxy resin), and 10 phr of 3,3',5,5'-tetramethyl-4,4-bis(glycidyloxy)-1,1'-biphenyl having an epoxy equivalency of 177 (second epoxy resin), the average epoxy equivalency of the second epoxy resin is calculated as follows using equation (B). Incidentally, the average epoxy equivalency is rounded off to the closest whole number.

Average epoxy equivalency of the second epoxy resin=(92×40/100)+(177×10/100)=55

The average epoxy equivalency of the matrix resin is calculated as follows using the above value and equation (A).

Average epoxy equivalency of the matrix resin=[106×(50/100)]+54.5=108

In the present embodiment, the average epoxy equivalency of the matrix resin is controlled within a range of 99 to 163 by changing the types and ratios of the first and second epoxy resins.

As described above, the matrix resin contains the first epoxy resin, which has a rigid molecular structure and a low epoxy equivalency, and may further contain at least one of the above epoxy resins for the second epoxy resin. Therefore, the structure produced by hardening of the matrix material is capable of exhibiting increased strength. Furthermore, the matrix material has a relatively large number of epoxy groups for forming chemical bonds on the surface of the carbon fiber, and the adhesive strength at the interface between the matrix material and the carbon fiber can desirably be increased.

If the epoxy resin has a larger number of epoxy groups per unit weight, the epoxy resin tends to exhibit higher viscosity. However, if the epoxy resin has an excessively high viscosity, the contact area between the carbon fiber and the epoxy resin is reduced, so that it is difficult to increase the adhesive strength between the carbon fiber and the epoxy resin. On the other hand, if the epoxy resin has a smaller number of epoxy groups, the epoxy resin exhibits lower adhesive strength on the carbon fiber, due to the fact that the epoxy groups act as one factor responsible for bonding the epoxy resin to the carbon fiber.

In the present embodiment, the matrix resin has an average epoxy equivalency of 163 or less, whereby an excessive increase in viscosity of the matrix resin can be prevented, while at the same time the adhesive strength between the matrix material and the carbon fiber can be increased sufficiently. Therefore, a reduction in wettability of the matrix material on the surface of the carbon fiber can be prevented. Consequently, a reduction in the contact area between the carbon fiber surface and the matrix material, accompanied by a reduction in adhesive strength, can be prevented.

If the epoxy resin has a larger number of epoxy groups, the hardened epoxy resin is lower in toughness, although the hardened epoxy resin exhibits an increase in strength. In the case that the average epoxy equivalency of the matrix resin is controlled within the above range, strength as well as toughness (impact resistance) of the hardened matrix resin can be well-balanced.

In the present embodiment, if the matrix resin has an average epoxy equivalency of 99 or more, the strength of the matrix material, which includes the hardening strength and the adhesive strength thereof with respect to the carbon fiber, can desirably be improved. Furthermore, an excessive increase in the crosslink density of the matrix material can be prevented, and thus a reduction in toughness caused by such an increase can be prevented. Thus, embrittlement of the matrix material can be prevented effectively.

For example, it is preferred that the epoxy equivalency of the first epoxy resin and the average epoxy equivalency of the second epoxy resin are controlled within the ranges of 21 to 106 and 0 to 142, respectively. If the first epoxy resin has an epoxy equivalency of 21 or more, an excessive increase in the epoxy group number and hence an excessive increase in the crosslink density of the matrix material can be prevented, so that embrittlement of the matrix material can be prevented. If the second epoxy resin has an average epoxy equivalency of 142, the epoxy group number can be increased sufficiently, and the adhesive strength between the carbon fiber and the matrix material can desirably be improved. Consequently, in the case that the average epoxy equivalency of the matrix resin is controlled within the above range by mixing the first and second epoxy resins, the resultant structure is made capable of exhibiting both excellent strength and toughness.

In the case that the first epoxy resin contains tetraglycidyldiaminodiphenylmethane and the second epoxy resin contains at least one of N,N-bis(oxiranylmethyl)-4-(oxiranylmethoxy)aniline and 3,3',5,5'-tetramethyl-4,4-bis(glycidyloxy)-1,1'-biphenyl, preferably, the matrix resin contains 20 to 100 phr of tetraglycidyldiaminodiphenylmethane and 80 to 0 phr of at least one of a p-aminophenol-type epoxy resin and a tetramethylbiphenol-type solid epoxy resin.

More preferably, the matrix resin contains 30 to 80 phr of tetraglycidyldiaminodiphenylmethane and 70 to 20 phr of at least one of N,N-bis(oxiranylmethyl)-4-(oxiranylmethoxy)aniline and 3,3',5,5'-tetramethyl-4,4-bis(glycidyloxy)-1,1'-biphenyl.

The ratio of N,N-bis(oxiranylmethyl)-4-(oxiranylmethoxy)aniline is preferably 0 to 50 phr, the ratio of 3,3',5,5'-tetramethyl-4,4-bis(glycidyloxy)-1,1'-biphenyl is preferably 0 to 60 phr, and the matrix resin preferably contains both of these resins.

If the ratio of the first epoxy resin having four epoxy groups in one molecule is increased as described above, the epoxy group number of the matrix resin can effectively be increased. Therefore, if the ratio of the first epoxy resin in the matrix resin is 20 phr or greater, both the adhesive strength between the matrix material and the carbon fiber and the hardening strength of the matrix material can advantageously be increased.

By controlling the ratio of the second epoxy resin so as to lie within the above range, depending on the intended use of the structure, the epoxy group number per unit weight can be well-balanced with the viscosity of the matrix material. Thus, the contact area between the carbon fiber surface and the matrix material can be increased, and chemical bonds can desirably be formed by the epoxy groups at the interface therebetween. Consequently, interfacial adhesive strength between the carbon fiber and the matrix material can advantageously be increased.

The carbon fiber may have a concave-convex (irregular or rough) surface. For example, the carbon fiber surface may be subjected to an etching treatment or the like. In this case, if the viscosity of the matrix material is controlled as described above, the matrix material can be introduced effectively and desirably into the concave-convex shape of the carbon fiber. Consequently, the contact area between the carbon fiber surface and the matrix material is increased, and an anchoring effect can be produced between the carbon fiber surface and the matrix material, thereby enabling a further enhancement in adhesive strength.

As a result, in a structure produced from the matrix material and the carbon fiber, a reduction in strength in a particular direction due to the anisotropic characteristic thereof can be suppressed, and further, the strength of the entire structure can effectively be improved. In addition, the structure is excellent in other properties such as heat resistance and impact resistance.

The structure can be produced using the matrix material, without requiring application of an additional sizing agent to the carbon fiber surface. Therefore, a complicated process and increased costs are not required to produce the structure.

As described above, the resin component in the matrix material contains only epoxy resins, and the resin component is free of other resins (different types of resins) apart from epoxy resins. Therefore, unlike a case in which a plurality of different resins are mixed, epoxy resins do not exhibit excessively different molding shrinkage ratios, and the epoxy resins are compatible with each other. Consequently, inhibition of resin hardening and cracking of the structure can be prevented, and the strength and heat resistance of the structure can advantageously be improved.

Accordingly, in the present embodiment, interfacial adhesion between the carbon fiber and the matrix material can be increased easily and inexpensively, and further, strength, heat resistance, impact resistance, and the like of the resultant structure can be improved sufficiently. Consequently, the resultant structure can suitably be used as a member of an aircraft. Thus, according to the present embodiment, a member for an aircraft can be provided with high reliability.

The hardener, which is contained in the matrix material, is not limited insofar as the hardener is capable of hardening the epoxy resin. For example, an aromatic polyamine or the like may be used as the hardener. The hardener preferably is composed of 4,4-diaminodiphenylsulfone as represented by the following structural formula (4). A commercially available product such as Aradur976-1 (trade name, available from Huntsman Advanced Materials) may be used as the hardener.

(4)

Incidentally, Araldite, jER, and Aradur are registered trademarks.

The ratio of the hardener to the matrix resin may be selected depending on the average epoxy equivalency of the matrix resin. Preferably, 40 to 64 parts by weight of the hardener are added to 100 parts by weight of the matrix resin. If the ratio of the hardener is 40 parts by weight or greater, the matrix material can be hardened sufficiently. If the ratio of the hardener is 64 parts by weight or less, an unexpected side reaction caused by excess hardener can be prevented. Thus, in the case that the ratio of the hardener is controlled within the above range, the structure can be produced efficiently and exhibit a further enhancement in strength.

For example, in the case that the CFRP structure, which is produced from the matrix material, is used as a member for an aircraft, the carbon fiber preferably comprises a PAN-based fiber having suitable properties such as low density, high strength, and high elasticity. Such a PAN-based carbon fiber is obtained by carbonizing a PAN (polyacrylonitrile) fiber at a high temperature. The carbon fiber preferably has a tensile strength of 2000 to 7000 MPa, a tensile elastic modulus of 200 to 1000 GPa, and a density of 1.5 to 2.5 g/cm$^3$.

The adhesive strength between the matrix material and the carbon fiber, which is measured by a microdroplet method, preferably is 66 to 121 MPa. If the adhesive strength lies within this range, the hardened matrix material can exhibit sufficient strength, and the resultant structure can be used in various fields. If the adhesive strength is 66 MPa or greater, adhesion between the matrix material and the fiber can be increased sufficiently, and breakage at the interface between the matrix material and the fiber can effectively be prevented. If the adhesive strength is 121 MPa or less, there is no need for the epoxy group number and the crosslink density of the matrix material to be increased significantly, and a reduction in toughness of the structure can be prevented.

For example, the microdroplet method for measuring adhesive strength may be a composite interface property evaluation method, as described in Japanese Laid-Open Patent Publication No. 08-334455.

In the present method, both ends of a carbon fiber having a certain length are fixed to a holder, and a melt of the matrix material is attached to the carbon fiber to form a microdroplet thereon.

The holder is placed in a heating furnace or the like, whereby the microdroplet is hardened, and a blade is placed on the carbon fiber. The blade allows displacement of the carbon fiber but inhibits displacement of the microdroplet. Thereafter, one of the blade and the holder is fixed while the other is moved, and a load is applied until the microdroplet becomes separated from the carbon fiber by the blade. In order to obtain the adhesive strength (shear strength), the maximum load applied to the microdroplet during the separation process is measured, and the measured value is divided by the contact area between the microdroplet and the carbon fiber prior to measurement.

As described above, according to the present embodiment, the interfacial adhesive strength between the carbon fiber and the matrix material can be increased inexpensively and easily. In addition, the structure can exhibit improved strength in a well-balanced fashion with heat resistance, impact resistance, and the like. Consequently, the structure can exhibit excellent properties, which are suitable for use in a member of an aircraft.

The present invention is not limited to the above embodiment, and various changes and modifications may be made to the embodiment without departing from the scope of the invention.

Examples 1 to 9

Araldite MY721 (available from Huntsman Advanced Materials, hereinafter referred to also as MY721) was used as a polyfunctional glycidylamine-type epoxy resin in a first epoxy resin. jER630 and YX4000 (both available from Mitsubishi Chemical Corporation) were used, respectively, as a p-aminophenol-type epoxy resin and a tetramethylbiphenol-type solid epoxy resin in a second epoxy resin. Furthermore, Aradur 976-1 (available from Huntsman Advanced Materials) was used as a hardener.

The hardener was added to an epoxy resin component containing both the first epoxy resin (MY721) and the second epoxy resin (jER630 and/or YX4000), or containing only the first epoxy resin, in order to prepare a matrix material according to the following examples. More specifically, matrix materials according to Examples 1 to 9 were prepared by mixing the hardener and the epoxy resins MY721, jER630, and YX4000 at the composition ratios shown in FIG. 1.

Figure 1:
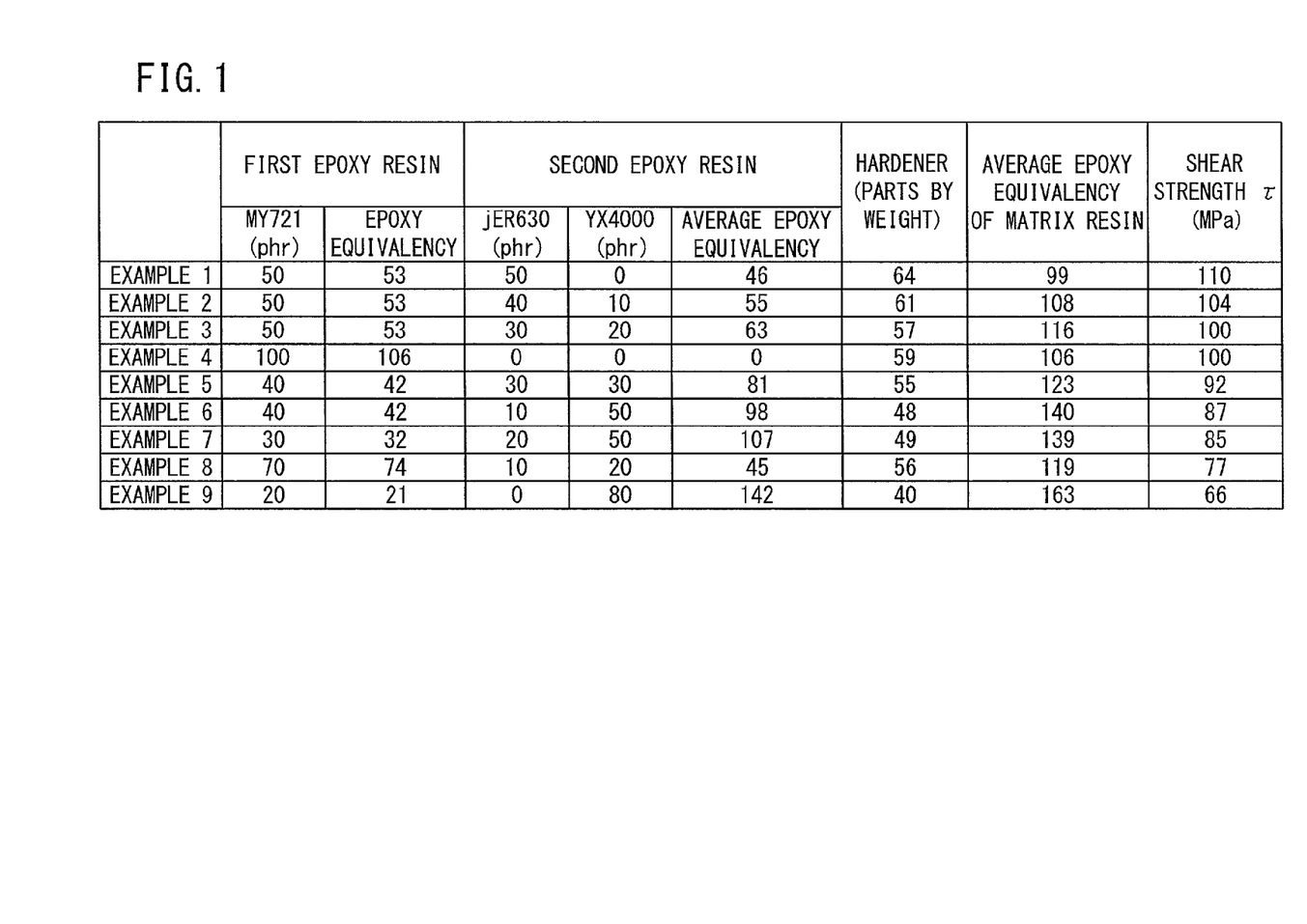
FIG. 1 is a table showing relationships, in matrix materials according to Examples 1 to 9, between the composition ratios of epoxy resins and a hardener, the average epoxy equivalency of a matrix resin, and the adhesive strength (shear strength t) on a carbon fiber A measured by a microdroplet method.

The epoxy resins MY721, jER630, and YX4000 had epoxy equivalencies of 106, 92, and 177, respectively. The average epoxy equivalencies of the matrix resins of Examples 1 to 9 were calculated from the epoxy equivalencies and the composition ratios of MY721, jER630, and YX4000, as shown in FIG. 1.

T800SC (trade name, available from Toray Industries, Inc.) was used as a carbon fiber A. The carbon fiber A had a fiber diameter of 5.5 μm, a tensile strength of 5880 MPa, and a tensile elastic modulus of 294 GPa.

The interfacial adhesive strength (shear strength τ) between the carbon fiber A and each of the matrix materials of Examples 1 to 9 was measured by a microdroplet method. A composite interface property evaluation apparatus HM410 (available from Tohei Sangyo Co., Ltd.) was used to perform this measurement. More specifically, initially, both ends of a single carbon fiber A were fixed by adhesive tape to a holder. A melt of the matrix material was attached to the surface of the carbon fiber A by a spatula in order to form a microdroplet.

The holder was placed in a heating furnace, and the microdroplet was hardened in air at 180° C. for 2 hours. A blade was placed on the carbon fiber A, and the blade and the holder were moved relatively to each other at a rate of 0.1 mm/min, whereby a tensile load was applied to the microdroplet by the blade. The maximum tensile load F(N) required for separating the microdroplet from the carbon fiber A was measured, and the shear strength (MPa) was calculated based on the formula F/(πDL). Incidentally, in this formula, D represents the diameter (m) of the carbon fiber A, and L represents the fiber adhesion length (m) of the microdroplet.

The above measurement was carried out six times, an average of the measured values was calculated, and the standard deviation was subtracted from the average value in order to obtain the shear strength τ. Based on the shear strength τ, the interfacial adhesive strength between the carbon fiber A and the matrix material was evaluated.

The epoxy equivalencies and the shear strengths τ of the matrix materials of Examples 1 to 9, which were obtained in the above manner, are shown in FIG. 1.

Examples 10 to 19

Figure 2:
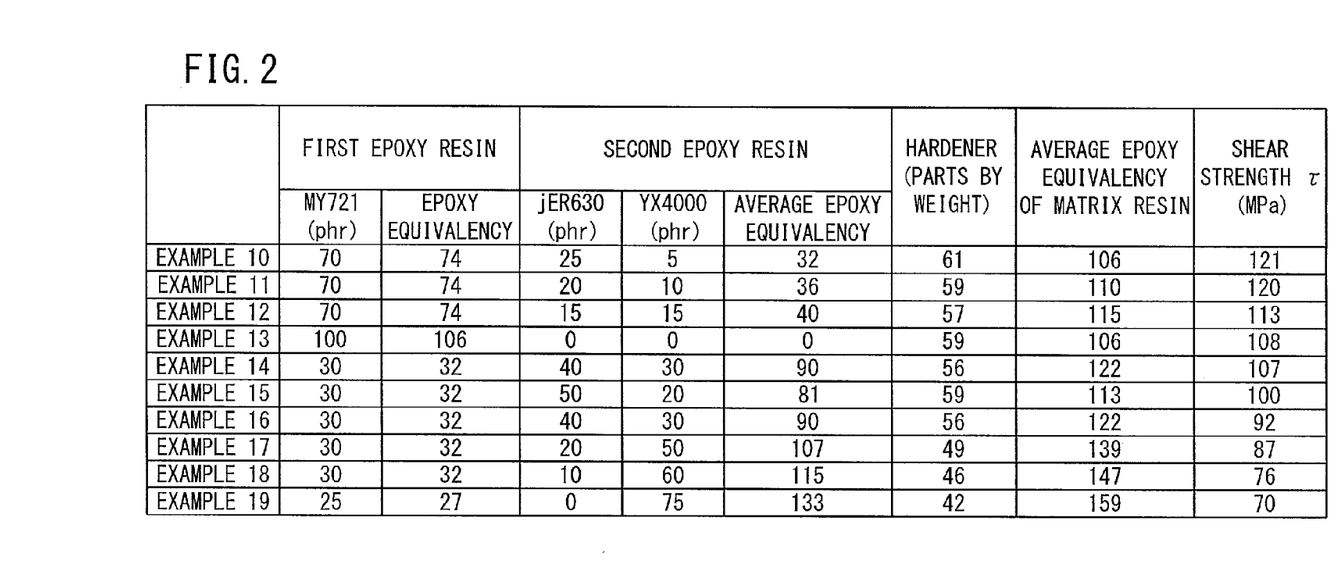
FIG. 2 is a table showing relationships, in matrix materials according to Examples 10 to 19, between the composition ratios of epoxy resins and a hardener, the average epoxy equivalency of a matrix resin, and the shear strength τ on a carbon fiber B.

Matrix materials according to Examples 10 to 19 were prepared by mixing the hardener and the epoxy resins MY721, jER630, and YX4000 at the composition ratios shown in FIG. 2, in the same manner as Examples 1 to 9. The average epoxy equivalencies of the matrix materials of Examples 10 to 19 were calculated in the same manner as Examples 1 to 9.

IMS60 (trade name, available from Toho Tenax Co., Ltd.) was used as a carbon fiber B. The carbon fiber B had a fiber diameter of 5.5 μm, a tensile strength of 5800 MPa, and a tensile elastic modulus of 290 GPa. The interfacial adhesive strength (shear strength τ) between the carbon fiber B and each of the matrix materials of Examples 10 to 19 was measured using a microdroplet method in the same manner as described above.

The epoxy equivalencies and the shear strengths τ of the matrix materials of Examples 10 to 19 are shown in FIG. 2.

Comparative Example

A bisphenol A-type epoxy resin (a polycondensation product of 4,4-isopropylidenediphenol and 1-chloro-2,3-epoxypropane) represented by the following structural formula (5) is known as a conventional epoxy resin. jER828 (trade name, available from Mitsubishi Chemical Corporation) was used as the bisphenol A-type epoxy resin, and the above hardener was added thereto in order to prepare a matrix material according to the Comparative Example.

(5)

Figure 3:
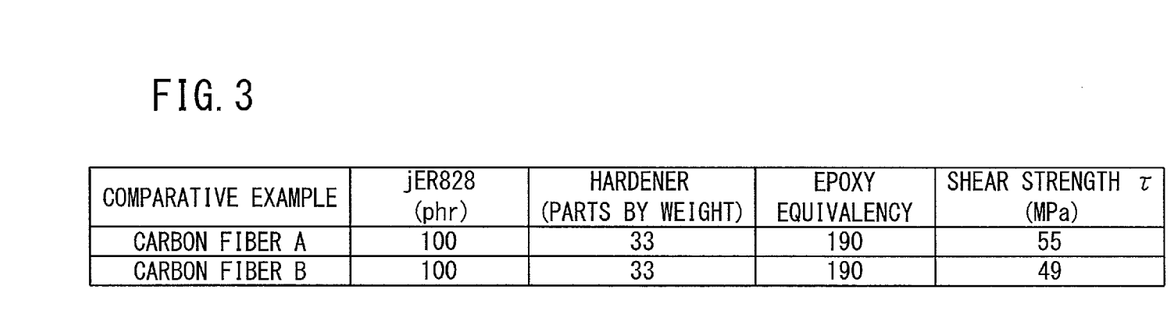
FIG. 3 is a table showing relationships, in a matrix material according to a Comparative Example, between the composition ratios of an epoxy resin and a hardener, the epoxy equivalency of the epoxy resin, and the shear strengths τ on the carbon fibers A and B.

The interfacial adhesive strength (shear strength τ) between the carbon fiber A or B and the matrix material of the Comparative Example was measured using a microdroplet method in the same manner as described above. The results are shown in FIG. 3. Incidentally, the epoxy resin jER828 had an epoxy equivalency of 190, and 33 parts by weight of the hardener was added to 100 parts by weight of the matrix resin of Comparative Example 1.

As shown in FIG. 1, in Examples 1 to 9, the matrix material of Example 1 exhibited the highest shear strength τ on the carbon fiber A. Thus, when the composition ratios of the epoxy resins MY721, jER630, and YX4000 and the hardener were 50, 50, 0, and 64, respectively, and the average epoxy equivalency of the matrix resin was 99, the shear strength τ was 110 MPa.

The matrix material of Example 9 exhibited the lowest shear strength τ on the carbon fiber A. Thus, when the composition ratios of the epoxy resins MY721, jER630, and YX4000 and the hardener were 20, 0, 80, and 40, respectively, and the average epoxy equivalency of the matrix resin was 163, the shear strength τ was 66 MPa. Incidentally, as shown in FIG. 3, the shear strength τ of the matrix material of the Comparative Example on the carbon fiber A was 55 MPa.

As shown in FIG. 2, in Examples 10 to 19, the matrix material of Example 10 exhibited the highest shear strength on the carbon fiber B. Thus, when the composition ratios of the epoxy resins MY721, jER630, and YX4000 and the hardener were 70, 25, 5, and 61, respectively, and the average epoxy equivalency of the matrix resin was 106, the shear strength τ was 121 MPa.

The matrix material of Example 19 exhibited the lowest shear strength τ on the carbon fiber B. Thus, when the composition ratios of the epoxy resins MY721, jER630, and YX4000 and the hardener were 25, 0, 75, and 42, respectively, and the average epoxy equivalency of the matrix resin was 159, the shear strength τ was 70 MPa. Incidentally, as shown in FIG. 3, the shear strength τ of the matrix material of the Comparative Example on the carbon fiber B was 49 MPa.

Thus, it was clear that the shear strengths τ of the matrix materials of Examples 1 to 19 were higher than the shear strength τ of the matrix material according to the Comparative Example.

In each of the matrix materials of Examples 1 to 19, the matrix resin contains the above epoxy resins having an average epoxy equivalency of 99 to 163. In addition, the matrix resin contains 20 phr or more of the first epoxy resin (MY721), and 40 to 64 parts by weight of the hardener is added to 100 parts by weight of the matrix resin. It is clear that a matrix material satisfying such conditions is capable of exhibiting an interfacial adhesive strength on the carbon fiber, which is higher than that of a material made using the conventional epoxy resin.

More specifically, the shear strengths τ of the matrix materials of Examples 1 to 19 lie within a range of 66 to 121 MPa, and the shear strengths τ are 1.2 to 2.5 times higher than that of a material using the conventional epoxy resin. In the case that the matrix material, which has an increased shear strength τ according to the present invention, is used for producing a CERP structure, the resultant structure can effectively be improved in strength, etc. Thus, the resultant structure can exhibit excellent properties suitable for use as a member of an aircraft.

What is claimed is:

1. A matrix material for a carbon fiber-reinforced composite comprising a matrix resin containing both a first epoxy resin and a second epoxy resin, wherein:

the first epoxy resin contains a polyfunctional glycidylamine-type epoxy resin having four epoxy groups in one molecule and has an epoxy equivalent weight of 21 to 74 g/equivalent;

the second epoxy resin contains both a p-aminophenol-type epoxy resin having three epoxy groups in one molecule, and a tetramethylbiphenol-type solid epoxy resin having two epoxy groups in one molecule, or contains only the tetramethylbiphenol-type solid epoxy resin, and the second epoxy resin has an average epoxy equivalent weight of 32 to 142 g/equivalent; and the matrix resin has an average epoxy equivalent weight of 99 to 163 g/equivalent, which is calculated using a following equation (A):

average epoxy equivalent weight of the matrix resin=
[epoxy equivalent weight of first epoxy resin×
(weight percentage of first epoxy resin/100)]+
average epoxy equivalent weight of second
epoxy resin     (A);

the average epoxy equivalent weight of the second epoxy resin is calculated using a following equation (B):

average epoxy equivalent weight of second epoxy
resin=[epoxy equivalent weight of p-aminophenol-type epoxy resin×(weight percentage of
p-aminophenol-type epoxy resin/100)]+[epoxy
equivalent weight of tetramethylbiphenol-type
solid epoxy resin×(weight percentage of tetramethylbiphenol-type solid epoxy resin/100)]     (B).

2. The matrix material according to claim 1, wherein the polyfunctional glycidylamine-type epoxy resin is represented by a following structural formula (1):

(1)

the p-aminophenol-type epoxy resin is represented by a following structural formula (2):

(2)

the tetramethylbiphenol-type solid epoxy resin is represented by a following structural formula (3):

(3)

and the matrix resin contains 20 to 70 phr of the polyfunctional glycidylamine-type epoxy resin, 0 to 50 phr of the p-aminophenol-type epoxy resin, and 80 to 5 phr of the tetramethylbiphenol-type solid epoxy resin.

3. The matrix material according to claim 2, wherein the matrix resin contains 30 to 80 phr of the polyfunctional glycidylamine-type epoxy resin, 10 to 50 phr of the p-aminophenol-type epoxy resin, and 5 to 60 phr of the tetramethylbiphenol-type solid epoxy resin.

4. The matrix material according to claim 1, wherein 40 to 64 parts by weight of a hardener is added to 100 parts by weight of the matrix resin.

5. The matrix material according to claim 1, wherein the matrix material has an adhesive strength of 66 to 121 MPa with respect to a carbon fiber, which is measured by a microdroplet method.

6. A matrix material for a carbon fiber-reinforced composite comprising a matrix resin containing both a first epoxy resin and a second epoxy resin, wherein:

the first epoxy resin contains a polyfunctional glycidylamine-type epoxy resin having four epoxy groups in one molecule and being represented by a structural formula (1)

(1)

the second epoxy resin contains both a p-aminophenol-type epoxy resin having three epoxy groups in one molecule and being represented by a structural formula (2) below, and a tetramethylbiphenol-type solid epoxy resin having two epoxy groups in one molecule and being represented by a structural formula (3) below, or contains only the tetramethylbiphenol-type solid epoxy resin (2)

(3)

and the matrix resin contains 30 to 80 phr of the polyfunctional glycidylamine-type epoxy resin, 10 to 50 phr of the p-aminophenol-type epoxy resin, and 5 to 60 phr of the tetramethylbiphenol-type solid epoxy resin, the matrix resin has an average epoxy equivalent weight of 99 to 163 g/equivalent, which is calculated using a following equation (A):

average epoxy equivalent weight of the matrix resin= [epoxy equivalent weight of first epoxy resin× (weight percentage of first epoxy resin/100)]+ average epoxy equivalent weight of second epoxy resin    (A);

the average epoxy equivalent weight of the second epoxy resin is calculated using a following equation (B):

average epoxy equivalent weight of second epoxy resin=[epoxy equivalent weight of p-aminophenol-type epoxy resin×(weight percentage of p-aminophenol-type epoxy resin/100)]+[epoxy equivalent weight of tetramethylbiphenol-type solid epoxy resin×(weight percentage of tetramethylbiphenol-type solid epoxy resin/100)]    (B).

7. The matrix material according to claim 6, wherein 40 to 64 parts by weight of a hardener is added to 100 parts by weight of the matrix resin.

8. The matrix material according to claim 6, wherein the matrix material has an adhesive strength of 66 to 121 MPa with respect to a carbon fiber, which is measured by a microdroplet method.

* * * * *